US012081739B2

United States Patent
Lee

(10) Patent No.: US 12,081,739 B2
(45) Date of Patent: *Sep. 3, 2024

(54) IMAGE CODING METHOD BASED ON AFFINE MOTION PREDICTION, AND DEVICE FOR SAME

(71) Applicant: GUANGDONG OPPO MOBILE TELECOMMUNICATIONS CORP., LTD., Guangdong (CN)

(72) Inventor: Jaeho Lee, Seoul (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,512

(22) Filed: Feb. 17, 2023

(65) Prior Publication Data
US 2023/0209044 A1 Jun. 29, 2023

Related U.S. Application Data

(63) Continuation of application No. 17/710,086, filed on Mar. 31, 2022, now Pat. No. 11,611,744, which is a
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11); *H04N 19/176* (2014.11)

(58) Field of Classification Search
CPC .. H04N 19/105; H04N 19/132; H04N 19/137; H04N 19/176
See application file for complete search history.

(56) References Cited

U.S. PATENT DOCUMENTS

2017/0332095 A1 11/2017 Zou et al.
2017/0374379 A1 12/2017 Chen et al.
(Continued)

FOREIGN PATENT DOCUMENTS

CN   105163116   12/2015
CN   106537915   3/2017
(Continued)

OTHER PUBLICATIONS

Chen et al., "Algorithm Description of Joint Exploration Test Model 3," JVET-C1001_v3, Presented at Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pages.
(Continued)

*Primary Examiner* — James T Boylan
(74) *Attorney, Agent, or Firm* — Hodgson Russ LLP

(57) ABSTRACT

A picture decoding method implemented by a decoding device, according to the present invention, comprises the steps of: acquiring motion prediction information from a bitstream; generating an affine MVP candidate list comprising affine MVP candidates for the current block; deriving CPMVPs for the respective CPs of the current block on the basis of one affine MVP candidate among the affine MVP candidates included in the affine MVP candidate list; deriving CPMVDs for the CPs of the current block on the basis of information on the CPMVDs for the respective CPs included in the acquired motion prediction information; and deriving CPMVs for the CPs of the current block on the basis of the CPMVPs and the CPMVDs.

4 Claims, 14 Drawing Sheets

Related U.S. Application Data continuation of application No. 17/060,657, filed on Oct. 1, 2020, now Pat. No. 11,323,696, which is a continuation of application No. PCT/KR2019/003816, filed on Apr. 1, 2019.

(60) Provisional application No. 62/651,244, filed on Apr. 1, 2018.

(51) Int. Cl.
   H04N 19/137 (2014.01)
   H04N 19/176 (2014.01)

(56) References Cited

U.S. PATENT DOCUMENTS

| | | | |
|---|---|---|---|
| 2018/0098063 A1* | 4/2018 | Chen | H04N 19/52 |
| 2019/0116376 A1* | 4/2019 | Chen | H04N 19/70 |
| 2019/0327482 A1 | 10/2019 | Lin et al. | |

FOREIGN PATENT DOCUMENTS

| | | |
|---|---|---|
| JP | 2012-165278 | 8/2012 |
| KR | 10-2017-0125086 | 11/2017 |
| KR | 10-2018-0006961 | 1/2018 |
| KR | 10-2018-0028513 | 3/2018 |
| WO | 2017118409 | 7/2017 |
| WO | WO 2017/118411 | 7/2017 |
| WO | WO 2017/133243 | 8/2017 |
| WO | 2017147765 | 9/2017 |
| WO | 2017148345 | 9/2017 |
| WO | WO 2017/171107 | 10/2017 |

OTHER PUBLICATIONS

Extended European Search Report in EP Appln. No. 19780669.8, dated Dec. 22, 2020, 12 pages.
JVET, "Algorithm Description of Joint Exploration Test Model 1 (JEM 1)," International Organization for Standardization, ISO/IEC JTC1/SC29/WG 11, Coding of Moving Pictures and Audio, Oct. 2015, Geneva, CH, 27 pages.
Office Action in European Appln. No. 19780669.8, dated Nov. 15, 2022, 11 pages.
Office Action in Japanese Appln. No. 2021-502682, dated Dec. 14, 2021, 10 pages (with English translation).
Office Action in Japanese Appln. No. 2021-502682, dated Jul. 14, 2022, 5 pages (with English translation).
Qualcomm, Inc., "Improved Affine Motion Vector Coding," JVET-D0128, Joint Video Exploration Team (JVET) of ITU-T SG 16 WP 3 and ISO/IEC JTC 1/SC 29/WG 11 4th Meeting, Chengdu, China, Oct. 15-21, 2016, 3 pages.
Lee et al., "A unified condition for affine merge and affine inter mode," Joint Video Exploration Team (JVET) of ITU-T SG 16 WP 3 and ISO/IEC JTC 1/SC 29/WG 11, JVET-E0039, Jan. 2017.
CNIPA, Notification to Grant Patent Right for Invention for CN Application No. 201980029205.3, May 9, 2023.
EPO, Summons to attend oral proceedings for EP Application No. 19780669.8, Nov. 7, 2023.
JPO, Office Action for JP Application No. 2021-502682, Feb. 28, 2023.
JPO, Office Action for JP Application No. 2021-502682, Oct. 24, 2023.
Zou et al., "EE4: Improved affine motion prediction," Joint Video Exploration Team (JVET) of ITU-T SG 16 WP 3 and ISO/IEC JTC 1/SC 29/WG 11, JVET-D0121, Oct. 2016.
Chen et al. "Algorithm Description of Joint Exploration Test Model 7 (JEM 7)," Joint Video Exploration Team (JVET) of ITU-T SG 16 WP3 and ISO/IEC JTC 1/SC 29/WG 11, JVET-G1001-v1, Jul. 2017.
Koo et al., "Description of SDR video coding technology proposal by LG Electronics," Joint Video Experts Team (JVET) of ITU-T SG 16 WP 3 and ISO/IEC JTC 1/SC 29/WG 11, JVET-J0017-v1, Apr. 2018.
Chen et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WVG 11, JVET-J0021, Apr. 2018.
JPO, Decision to Grant a Patent for JP Application No. 2022-185636, Nov. 14, 2023.
KIPO, Office Action for KR Application No. 10-2020-7025162, Feb. 17, 2022.
KIPO, Office Action for KR Application No. 10-2022-7035558, Dec. 9, 2022.
KIPO, Notice of Preliminary Rejection for KR Application No. 10-2023-7027747, Dec. 8, 2023.
WIPO, International Search Report and Written Opinion for International Application No. PCT/KR2019/003816, Jul. 9, 2019.
EPO, Brief communication for EP Application No. 19780669.8, May 14, 2024.
EPO, Decision to refuse for EP Application No. 19780669.8, Jun. 11, 2024.

* cited by examiner

Translate

Scale

Rotate

Shear

IMAGE CODING METHOD BASED ON AFFINE MOTION PREDICTION, AND DEVICE FOR SAME

CROSS-REFERENCE TO RELATED APPLICATIONS

This application is a continuation of U.S. application Ser. No. 17/710,086, filed on Mar. 31, 2022, which is a continuation of U.S. application Ser. No. 17/060,657, filed on Oct. 1, 2020, now U.S. Pat. No. 11,323,696, which is a continuation pursuant to 35 U.S.C. § 119(e) of International Application PCT/KR2019/003816, with an international filing date of Apr. 1, 2019, which claims the benefit of U.S. Provisional Application No. 62/651,244 filed on Apr. 1, 2018, the contents of which are all hereby incorporated by reference herein in their entirety.

BACKGROUND OF THE DISCLOSURE

Field of the Disclosure

The present disclosure relates generally to an image coding technique and, more particularly, to an image coding method and apparatus which are based on affine motion prediction in an image coding system.

Related Art

Demands for high-resolution and high-quality images, such as HD (High Definition) images and UHD (Ultra High Definition) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

A technical objective of the present disclosure is to provide a method and apparatus which increase image coding efficiency.

Another technical objective of the present disclosure is to provide a method and apparatus which increase image coding efficiency based on affine motion prediction.

Another technical objective of the present disclosure is to provide a method and apparatus which increase image coding efficiency by efficiently determining a combination of neighboring blocks used in affine motion prediction.

Another technical objective of the present disclosure is to provide a method and apparatus which increase image coding efficiency by signaling information on an affine MVP candidate list used in affine motion prediction.

According to an example of the present disclosure, there is provided a picture decoding method which is performed by a decoding apparatus. The method includes obtaining motion prediction information from a bitstream; generating an affine motion vector predictor (MVP) candidate list including affine MVP candidates for a current block, deriving control point motion vector predictors (CPMVPs) for respective control points (CPs) of the current block based on one of the affine MVP candidates included in the affine MVP candidate list, deriving control point motion vector differences (CPMVDs) for the CPs of the current block based on information on the CPMVDs for the respective CPs included in the obtained motion prediction information, deriving control point motion vectors (CPMVs) for the CPs of the current block based on the CPMVPs and the CPMVDs, deriving prediction samples for the current block based on the CPMVs, and generating reconstructed samples for the current block based on the derived prediction samples.

According to another example of the present disclosure, there is provided a decoding apparatus performing picture decoding. The decoding apparatus includes an entropy decoder obtaining motion prediction information from a bitstream, an predictor generating an affine motion vector predictor (MVP) candidate list including affine MVP candidates for a current block, deriving CPMVPs for respective CPs of the current block based on one of the affine MVP candidates included in the affine MVP candidate list, deriving CPMVDs for the CPs of the current block based on information on the CPMVDs for the respective CPs included in the obtained motion prediction information, deriving CPMVs for the CPs of the current block based on the CPMVPs and the CPMVDs, and deriving prediction samples for the current block based on the CPMVs, and an adder generating reconstructed samples for the current block based on the derived prediction samples.

According to still another embodiment of the present disclosure, there is provided a picture encoding method which is performed by an encoding apparatus. The method includes generating an affine MVP candidate list including affine MVP candidates for a current block, deriving CPMVPs for respective CPs of the current block based on one of the affine MVP candidates included in the affine MVP candidate list, deriving CPMVs for the respective CPs of the current block, deriving CPMVDs for the CPs of the current block based on the CPMVPs and the CPMVs for the respective CPs, deriving prediction samples for the current block based on the CPMVs, deriving residual samples for the current block based on the derived prediction samples, and encoding information on the derived CPMVDs and residual information on the residual samples.

According to still another embodiment of the present disclosure, there is provided an encoding apparatus that performs picture encoding. The encoding apparatus includes a predictor generating an affine MVP candidate list including affine MVP candidates for a current block, deriving CPMVPs for respective CPs of the current block based on one of the affine MVP candidates included in the affine MVP candidate list, deriving CPMVs for the respective CPs of the current block, deriving CPMVDs for the CPs of the current block based on the CPMVPs and the CPMVs for the respective CPs, and deriving prediction samples for the current block based on the CPMVs, a residual processor deriving residual samples for the current block based on the derived prediction samples, and an entropy encoder encoding information on the derived CPMVDs and residual information on the residual samples.

According to the present disclosure, it is possible to increase overall image/video compression efficiency.

According to the present disclosure, it is possible to increase the efficiency of image coding based on the affine motion prediction.

According to the present disclosure, it is possible to increase image coding efficiency by signaling information on the affine MVP candidate list used for affine motion prediction.

DESCRIPTION OF EXEMPLARY EMBODIMENTS

Figure 1:
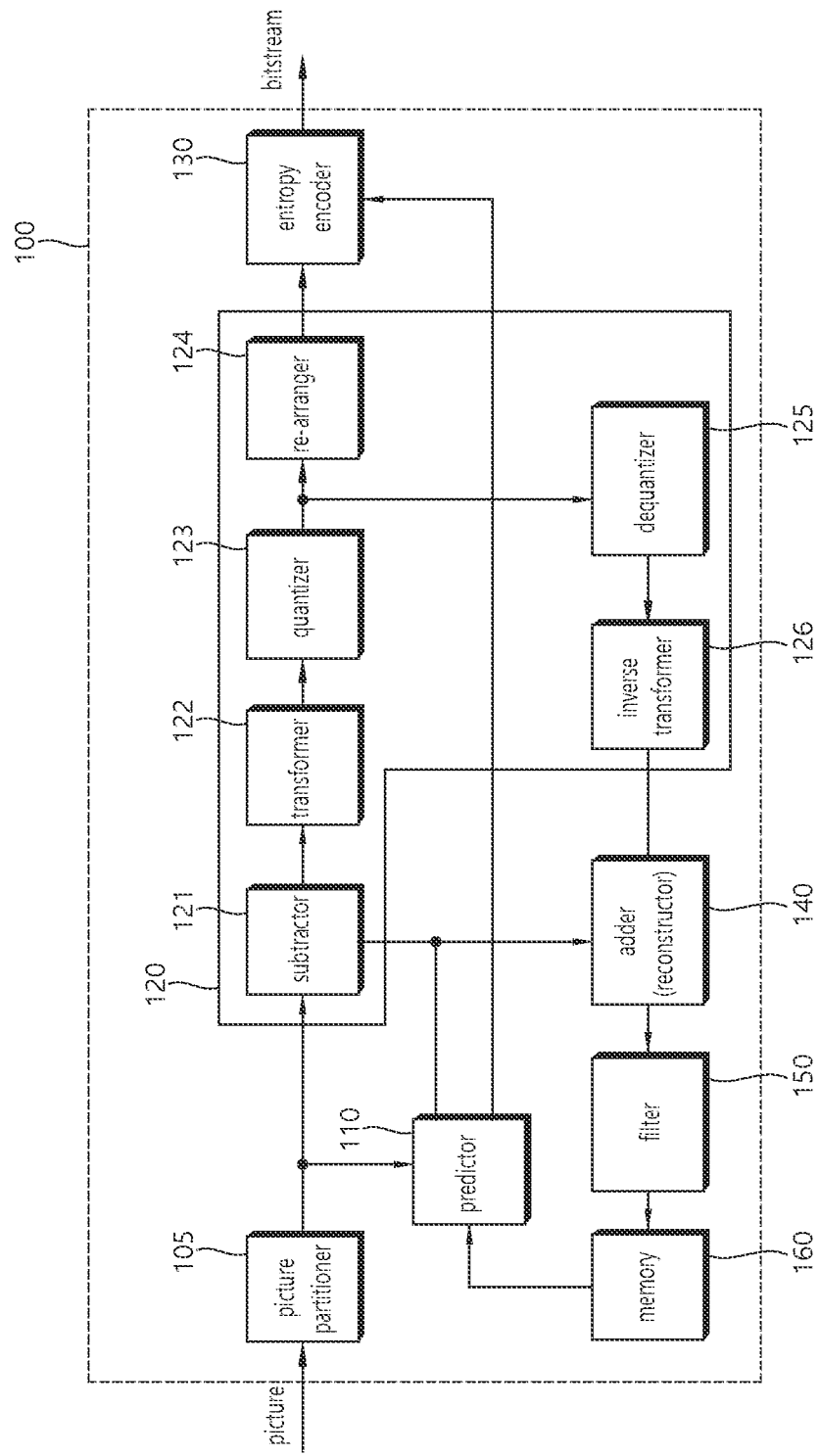
FIG. 1 is a diagram schematically illustrating a configuration of an encoding apparatus according to an embodiment.

According to an embodiment of the present disclosure, there is presented a picture decoding method performed by a decoding apparatus. The method includes obtaining motion prediction information from a bitstream; generating an affine motion vector predictor (MVP) candidate list including affine MVP candidates for a current block; deriving control point motion vector predictors (CPMVPs) for respective control points (CPs) of the current block based on one of the affine MVP candidates included in the affine MVP candidate list; deriving control point motion vector differences (CPMVDs) for the CPs of the current block based on information on the CPMVDs for the respective CPs included in the obtained motion prediction information; deriving control point motion vectors (CPMVs) for the CPs of the current block based on the CPMVPs and the CPMVDs; deriving prediction samples for the current block based on the CPMVs; and generating reconstructed samples for the current block based on the derived prediction samples.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 briefly illustrates a structure of an encoding apparatus to which the present disclosure is applicable. Hereinafter, an encoding/decoding apparatus may include a video encoding/decoding apparatus and/or an image encoding/decoding apparatus, and the video encoding/decoding apparatus may be used as a concept comprising the image encoding/decoding apparatus, or the image encoding/decoding apparatus may be used as a concept comprising the video encoding/decoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pred-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
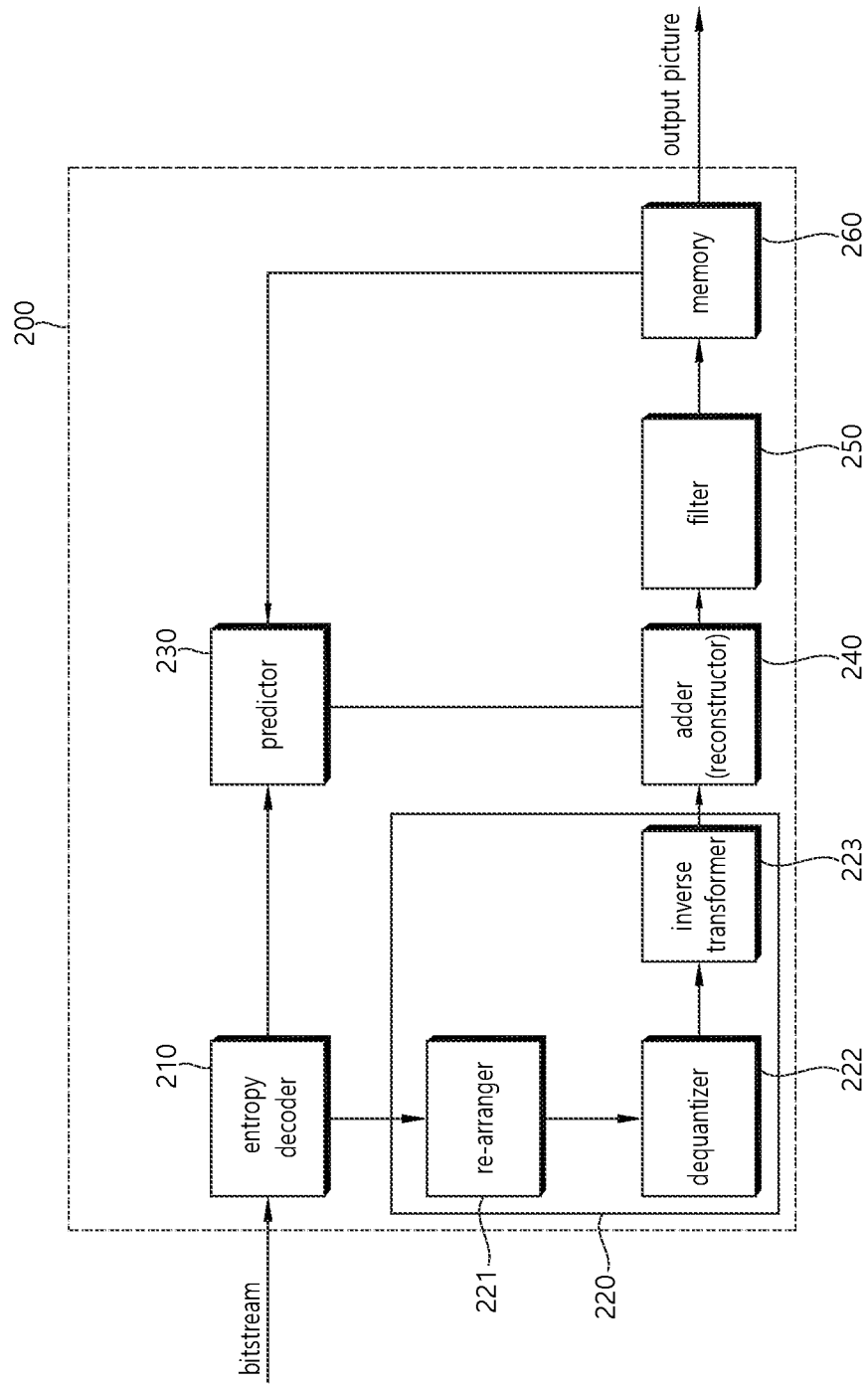
FIG. 2 is a diagram schematically illustrating a configuration of a decoding apparatus according to an embodiment.

FIG. 2 briefly illustrates a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223.

Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternery tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used. In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
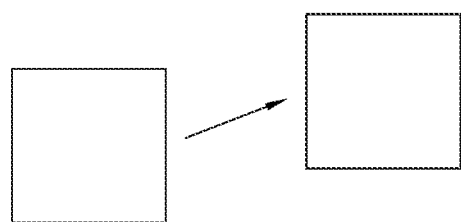
FIG. 3 is a diagram illustrating an example of motion expressed through an affine motion model according to an embodiment.
Figure 3:
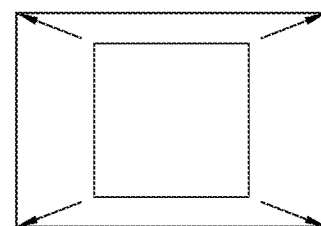
Figure 3:
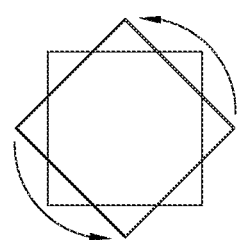
Figure 3:
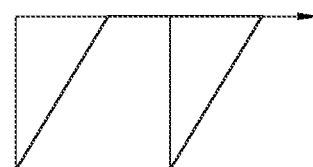

FIG. 3 is a diagram illustrating an example of motion expressed through an affine motion model according to an embodiment.

In the present specification, "CP", which is an abbreviation of a control point, may mean a sample or reference point serving as a reference when applying the affine motion model to the current block. A motion vector of the CP may be referred to as a "control point motion vector (CPMV)," and the CPMV may be derived based on a "control point motion vector predictor (CPMVP)" which is a CPMV predictor.

Referring to FIG. 3, the motions which can be expressed through the affine motion model according to an embodiment may include a translating motion, a scaling motion, a rotating motion and a shearing motion. That is, the affine motion model may efficiently express the translating motion that an image (or a part thereof) is moved in a plane over time, the scaling motion that an image (or a part thereof) is scaled over time, the rotating motion that an image (or a part thereof) is rotated over time, and the shearing motion that an image (or a part thereof) is deformed to a parallelogram overtime.

Affine inter prediction may be performed using the affine motion model according to an embodiment. The encoding apparatus/decoding apparatus may predict distortion shape of the image based on motion vectors at the CPs of the current block through the affine inter prediction, which can lead to increase in prediction accuracy, thus improving compression performance of an image. Further, a motion vector for at least one CP of the current block may be derived using the motion vector of the neighbor block of the current block, and thus it is possible to reduce data amount of added additional information, and improve inter prediction efficiency.

In one example, affine inter prediction may be performed based on motion information at three CPs for the current block, that is, three reference points. The motion information at three CPs for the current block may include the CPMV of each CP.

Figure 4:
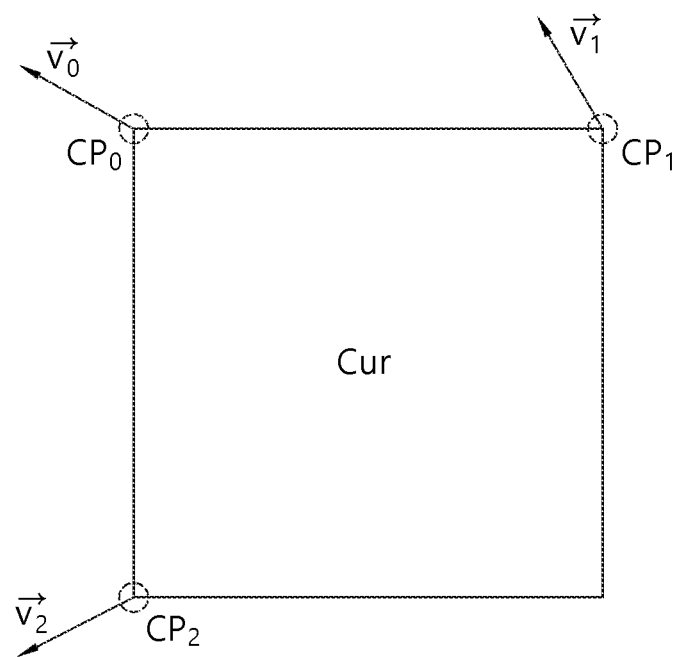
FIG. 4 is a diagram illustrating an example of an affine motion model using control point motion vectors (CPMVs) of three control points (CPs) for a current block.

FIG. 4 illustratively represents the affine motion model in which motion vectors for three CPs are used.

When the position of the top-left sample within the current block is (0,0), the width of the current block is 'w', and the height thereof is 'h', as shown in FIG. 4, samples located at (0,0), (w, 0) and (0, h) may be determined as the CPs for the current block. Hereinafter, the CP at the sample position (0,0) may be represented as CP0, the CP at the sample position (w,0) may be represented as CP1, and the CP at the sample position (0,h) may be represented as CP2.

The affine motion model according to an embodiment may be applied using the above-described respective CPs and motion vectors for the corresponding CPs. The affine motion model may be expressed as Equation 1 below.

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x + \frac{(v_{2y} - v_{0y})}{h} * y + v_{0y} \end{cases} \quad \text{[Equation 1]}$$

Here, w represents the width of the current block, h represents the height of the current block, $v_{0x}$ and $v_{0y}$ represent the x and y components of the motion vector of the CP0, respectively, $v_{1x}$ and $v_{1y}$ represent the x and y components of the motion vector of the CP1, respectively, and $v_{2x}$ and $v_{2y}$ represent the x and y components of the motion vector of CP2, respectively. In addition, x represents the x component of the position of the target sample within the current block, y represents the y component of the position of the target sample within the current block, $v_x$ represents the x component of the motion vector of the target sample within the current block, and $v_y$ represents the y component of the motion vector of the target sample within the current block.

Meanwhile, Equation 1 representing the affine motion model is only an example, and the equation for representing the affine motion model is not limited to Equation 1. For example, the sign of each coefficient disclosed in Equation 1 may be changed from that of Equation 1 in some cases, and the magnitude of the absolute value of each coefficient may also be changed from that of Equation 1 in some cases.

Since the motion vector of CP0, the motion vector of CP1, and the motion vector of CP2 are known, the motion vector according to the sample position within the current block may be derived based on Equation 1 above. That is, according to the affine motion model, the motion vectors v0($v_{0x}$, $v_{0y}$), v1($v_{1x}$, $v_{1y}$), v2($v_{2x}$, $v_{2y}$) at the CPs may be scaled based on a distance ratio between coordinates (x, y) of the target sample and three CPs, so that the motion vector of the target sample according to the target sample position may be derived. That is, according to the affine motion model, the motion vector of each sample within the current block may be derived based on the motion vectors of the CPs. Meanwhile, a set of the motion vectors of the samples within the current block derived according to the affine motion model may be referred to as an affine motion vector field.

Meanwhile, the six parameters for Equation 1 above may be expressed as a, b, c, d, e and f of following equations, and the equation for the affine motion model which is represented using the six parameters may be as below:

$$a = \frac{(v_{1x} - v_{0x})}{w} \quad b = \frac{(v_{2x} - v_{0x})}{h} \quad c = v_{0x}$$
$$d = \frac{(v_{1y} - v_{0y})}{w} \quad e = \frac{(v_{2y} - v_{0y})}{h} \quad f = v_{0y}$$
$$\begin{cases} v_x = a*x + b*y + c \\ v_y = d*x + e*y + f \end{cases}$$ [Equation 2]

Where w represents the width of the current block, h represents the height of the current block, $v_{0x}$ and $v_{0y}$ represent the x and y components of the motion vector of the CP0, respectively, $v_{1x}$ and $v_{1y}$ represent the x and y components of the motion vector of the CP1, respectively, and $v_{2x}$ and $v_{2y}$ represent the x and y components of the motion vector of CP2, respectively. In addition, x represents the x component of the position of the target sample within the current block, y represents the y component of the position of the target sample within the current block, $v_x$ represents the x component of the motion vector of the target sample within the current block, and $v_y$ represents the y component of the motion vector of the target sample within the current block.

Meanwhile, Equation 2 representing the affine motion model based on the six parameters is only an example, and the equation for representing the affine motion model based on the six parameters is not limited to Equation 2. For example, the sign of each coefficient disclosed in Equation 2 may be changed from that of Equation 2 in some cases, and the magnitude of the absolute value of each coefficient may also be changed from that of Equation 2 in some cases.

The affine motion model or the affine inter prediction using the six parameters may be referred to as a six-parameter affine motion model or AF6.

In one example, affine inter prediction may be performed based on motion information at three CPs for the current block, that is, three reference points. The motion information at three CPs for the current block may include the CPMV of each CP.

In one example, the affine inter prediction may be performed based on motion information at two CPs for the current block, that is, two reference points. The motion information at two CPs for the current block may include the CPMV of each CP.

Figure 5:
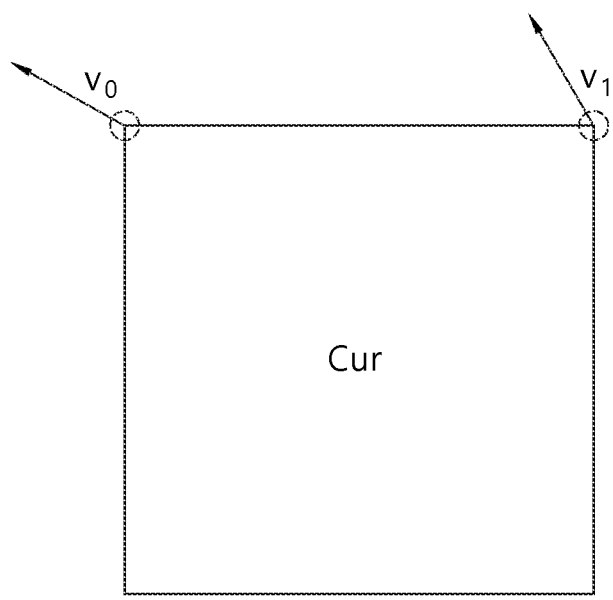
FIG. 5 is a diagram illustrating an example of an affine motion model using CPMVs of two CPs for a current block.

FIG. 5 illustratively represents the affine motion model in which motion vectors for two CPs are used.

The affine motion model using two CPs may express three motions including the translating motion, the scaling motion and the rotating motion. The affine motion model expressing three motions may be referred to as a similarity affine motion model or a simplified affine motion model.

When the position of the top-left sample within the current block is (0,0), the width of the current block is 'w', and the height thereof is 'h', as shown in FIG. 5, samples located at (0,0) and (w, 0) may be determined as the CPs for the current block. Hereinafter, the CP at the sample position (0,0) may be represented as CP0, and the CP at the sample position (w,0) may be represented as CP1.

The affine motion model based on four parameters may be applied using the above-described respective CPs and motion vectors for the corresponding CPs. The affine motion model may be expressed as Equation 3 below.

$$\begin{cases} v_x = \frac{(v_{1x} - v_{0x})}{w} * x - \frac{(v_{1x} - v_{0x})}{w} * y + v_{0x} \\ v_y = \frac{(v_{1y} - v_{0y})}{w} * x + \frac{(v_{1y} - v_{0y})}{w} * y + v_{0y} \end{cases}$$ [Equation 3]

Here, w represents the width of the current block, $v_{0x}$ and $v_{0y}$ represent the x and y components of the motion vector of CP0, respectively, and $v_{1x}$ and $v_{1y}$ represent the x and y components of the motion vector of CP1, respectively. In addition, x represents the x component of the position of the target sample within the current block, y represents the y component of the position of the target sample within the current block, $v_x$ represents the x component of the motion vector of the target sample within the current block, and $v_y$ represents the y component of the motion vector of the target sample within the current block.

Meanwhile, Equation 3 representing the affine motion model based on the four parameters is only an example, and the equation for representing the affine motion model based on the four parameters is not limited to Equation 3. For example, the sign of each coefficient disclosed in Equation 3 may be changed from that of Equation 3 in some cases, and the magnitude of the absolute value of each coefficient may also be changed from that of Equation 3 in some cases.

Meanwhile, four parameters for Equation 3 above may be represented as a, b, c and d of following Equation 4, and Equation 4 for the affine motion model which is represented using the four parameters may be expressed as below:

$$a = \frac{(v_{1x} - v_{0x})}{w} \quad b = \frac{(v_{1y} - v_{0y})}{w} \quad c = v_{0x} \quad d = v_{0y}$$
$$\begin{cases} v_x = a*x - b*y + c \\ v_y = b*x + a*y + d \end{cases}$$ [Equation 4]

Here, w represents the width of the current block, $v_{0x}$ and $v_{0y}$ represent the x and y components of the motion vector of CP0, respectively, and $v_{1x}$ and $v_{1y}$ represent the x and y components of the motion vector of CP1, respectively. In addition, x represents the x component of the position of the target sample within the current block, y represents the y component of the position of the target sample within the current block, $v_x$ represents the x component of the motion vector of the target sample within the current block, and $v_y$ represents the y component of the motion vector of the target sample within the current block. Since the affine motion model using the two CPs may be expressed with four parameters a, b, c and d as in Equation 4, the affine motion model or the affine inter prediction using the four parameters may be referred to as a four-parameter affine motion model or AF4. That is, according to the affine motion model, the motion vector of each sample within the current block may be derived based on the motion vectors of the control points. Meanwhile, a set of the motion vectors of the samples within the current block derived according to the affine motion model may be referred to as an affine motion vector field.

Meanwhile, Equation 4 representing the affine motion model based on the four parameters is only an example, and the equation for representing the affine motion model based on the four parameters is not limited to Equation 4. For example, the sign of each coefficient disclosed in Equation 4 may be changed from that of Equation 4 in some cases, and the magnitude of the absolute value of each coefficient may also be changed from that of Equation 4 in some cases.

Meanwhile, as described above, the motion vector of the sample unit may be derived through the affine motion model, and the accuracy of inter prediction can be considerably improved through this. However, in this case, the complexity may be greatly increased in the motion compensation process.

In another embodiment, it may be limited to derive the motion vector of a sub-block unit within the current block instead of the motion vector of the sample unit.

Figure 6:
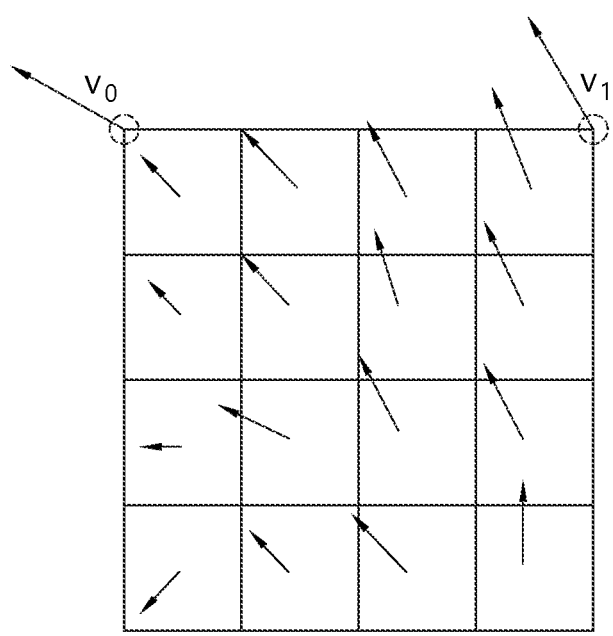
FIG. 6 is a diagram illustrating an example of deriving a motion vector in a sub-block unit based on an affine motion model.

FIG. 6 is a diagram illustrating an example of deriving a motion vector in a sub-block unit based on an affine motion model.

FIG. 6 illustratively represents a case where the size of the current block is 16×16, and the motion vector is derived in a 4×4 sub-block unit. The sub-block may be set in various sizes, and for example, if the sub-block is set in an n×n size (n is a positive integer, and for example, n is 4), the motion vector may be derived in an n×n sub-block unit within the current block based on the affine motion model, and various method for deriving a motion vector representing each sub-block may be applied.

For example, referring to FIG. 6, the motion vector of each sub-block may be derived setting a center or center lower right side sample position of each sub-block as representative coordinates. Here, the center lower right side position may represent a sample position located at a lower right side among four samples located at the center of the sub-block. For example, if n is an odd number, one sample may be located at the center of the sub-block, and in this case, the center sample position may be used for deriving the motion vector of the sub-block. However, if n is an even number, four samples may be located adjacent to the center of the sub-block, and in this case, the lower right side sample position may be used for deriving the motion vector. For example, referring to FIG. 6, representative coordinates for each of the sub-blocks may be derived as (2, 2), (6, 2), (10, 2), . . . , (14, 14), and the encoding apparatus/decoding apparatus may derive the motion vector of each sub-block by inputting each of the representative coordinates of the sub-blocks into Equations 1 to 3 above. Motion vectors of sub-blocks within the current block derived through the affine motion model may be referred to as affine MVF.

In an embodiment, when the above-described affine motion model is summarized into two steps, it may include a step of deriving the CPMV and a step of performing affine motion compensation.

Meanwhile, in the inter prediction using the above-described affine motion model, that is, the affine motion prediction, there may exist an affine merge mode (AF_MERGE or AAM) and an affine inter mode (AF_INTER or AAMVP).

Like the conventional skip/merge mode, the affine merge mode according to an embodiment may represent an encoding/decoding method which performs prediction by deriving the CPMV for each of two or three CPs from the neighboring block of the current block without coding a motion vector difference (MVD). Like the AMVP the affine inter mode (AAMVP) may explicitly represent a method of encoding/decoding the difference information between CPMV and CPMVP.

Meanwhile, the description of the affine motion model described above in FIGS. 3 to 6 is intended to assist in understanding the principle of the encoding/decoding method according to an embodiment of the present disclosure to be described later in this specification, so it will be easily understood by those skilled in the art that the scope of the present disclosure is not limited by the contents described above with reference to FIGS. 3 to 6.

In an embodiment, a method of constructing an affine MVP candidate list for the affine inter prediction will be described. In this specification, the affine MVP candidate list includes affine MVP candidates, and each affine MVP candidate may mean combination of CPMVPs of CP0 and CP1 in the four-parameter (affine)motion model, and may mean combination of CPMVPs of CP0, CP1 and CP2 in the six-parameter (affine) motion model. The affine MVP candidate described in this specification may be differently referred to as various names, such as, a CPMVP candidate, an affine CPMVP candidate, a CPMVP pair candidate, and a CPMVP pair. The affine MVP candidate list may include n affine MVP candidates, and when n is an integer greater than 1, encoding and decoding of information indicating an optimal affine MVP candidate may be required. When n is 1, encoding and decoding of information indicating the optimal affine MVP candidate may not be required. An example of the syntax when n is an integer greater than 1 is shown in Table 1 below, and an example of the syntax when n is 1 is shown in Table 2 below.

TABLE 1 parse merge_flag
if (merge_flag) {
...
}
else {
parse affine_flag
if (affine_flag) { // AAMVP
parse aamvp_idx
...
}
}

TABLE 2 parse merge_flag
if (merge_flag) {
...
}
else { // inter
parse affine_flag
if (affine_flag) { // AAMVP
~~parse aamvp_idx~~
...
}
}

In Tables 1 and 2, merge_flag is a flag for indicating whether or not it is in the merge mode. When the value of merge_flag is 1, the merge mode may be performed, and when the value of merge_flag is 0, the merge mode may not be performed. affine_flag is a flag for indicating whether or not the affine motion prediction is used. When the value of affine_flag is 1, the affine motion prediction may be used, and when the value of affine_flag is 0, the affine motion prediction may not be used. aamvp_idx is index information for indicating an optimal affine MVP candidate among n affine MVP candidates. It can be understood that, in Table 1 representing a case where n is an integer greater than 1, the optimal affine MVP candidate is represented based on the aamvp_idx, whereas in Table 2 representing a case where n is 1, there is only one affine MVP candidate, so aamvp_idx is not parsed.

In an embodiment, when determining the affine MVP candidate, the affine motion model of a neighboring block (hereinafter may also be referred to as an"affine coding block") encoded based on the affine motion prediction may be used. In an embodiment, when determining the affine MVP candidate, the first step and the second step may be performed. In the first step, it is possible to check whether or not each neighboring block has been encoded based on affine motion prediction while scanning the neighboring blocks in a predefined order. In the second step, the affine MVP candidate of the current block may be determined using the neighboring block encoded based on the affine motion prediction.

In the first step, up to m blocks encoded based on the affine motion prediction may be considered. For example, when m is 1, the affine MVP candidate may be determined using a affine coding block coming first in the scanning order. For example, when m is 2, the affine MVP candidate may be determined using affine coding blocks coming first and second in the scanning order. At this time, when a pruning check is performed and the first affine MVP candidate and the second affine MVP candidate are the same, a scanning process may be additionally performed to determine an additional affine MVP candidate. Meanwhile, in an embodiment, m described in the present embodiment may not exceed the value of n described above in the description of Tables 1 and 2.

Meanwhile, in the first step, the process of checking whether or not each neighboring block is encoded based on the affine motion prediction while scanning neighboring blocks may be embodied in various ways. Hereinafter, embodiments of a process of checking whether or not each neighboring block is encoded based on the affine motion prediction while scanning neighboring blocks will be described in FIGS. 7 to 10.

FIGS. 7 to 10 illustrate examples of a method of detecting a neighboring block coded based on the affine motion prediction.

Figure 7:
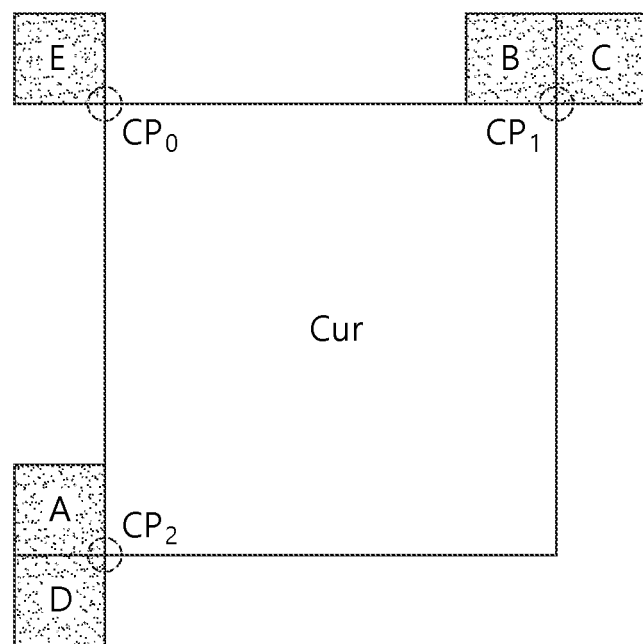
FIGS. 7 to 10 illustrate examples of a method of detecting a neighboring block coded based on the affine motion prediction.

Referring to FIG. 7, 4×4 blocks A, B, C, D, and E are shown at the neighbor of the current block. The block E, which is a top-left corner neighboring block, is located at the neighbor of the CP0, the block C, which is a top-right corner neighboring block, and the B block, which is a top neighboring block, are located at the neighbor of the CP1, and the block D, which is a bottom-left corner neighboring block, and the A block, which is a left neighboring block, are located at the neighbor of the CP2. The arrangement according to FIG. 7 can contribute to reducing design cost because it can share the structure with methods according to the AMVP or the merge mode.

Figure 8:
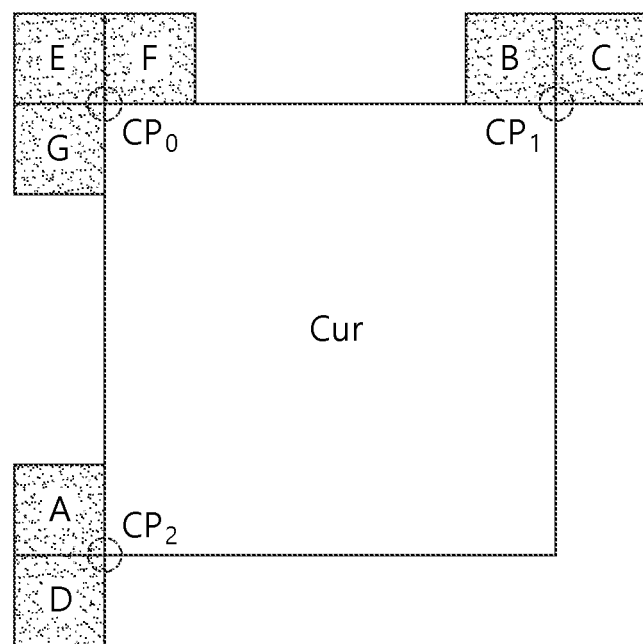

Referring to FIG. 8, 4×4 blocks A, B, C, D, E, F and G are shown at the neighbor of the current block. The block E, which is a top-left corner neighboring block, the block G, which is a first left neighboring block, and the block F, which is a top neighboring block, are located at the neighbor of the CP0, the block C, which is a top-right corner neighboring block, and the B block, which is a second top neighboring block, are located at the neighbor of the CP1, and the block D, which is a bottom-left corner neighboring block, and the A block, which is a second left neighboring block, are located at the neighbor of the CP2. The arrangement according to FIG. 8 determines whether or not it is coded based on the affine motion prediction based only on 4×4 blocks adjacent to the three CPs, so it is possible to minimize increase in the scanning complexity and it may be also effective in terms of the encoding performance.

Figure 9:
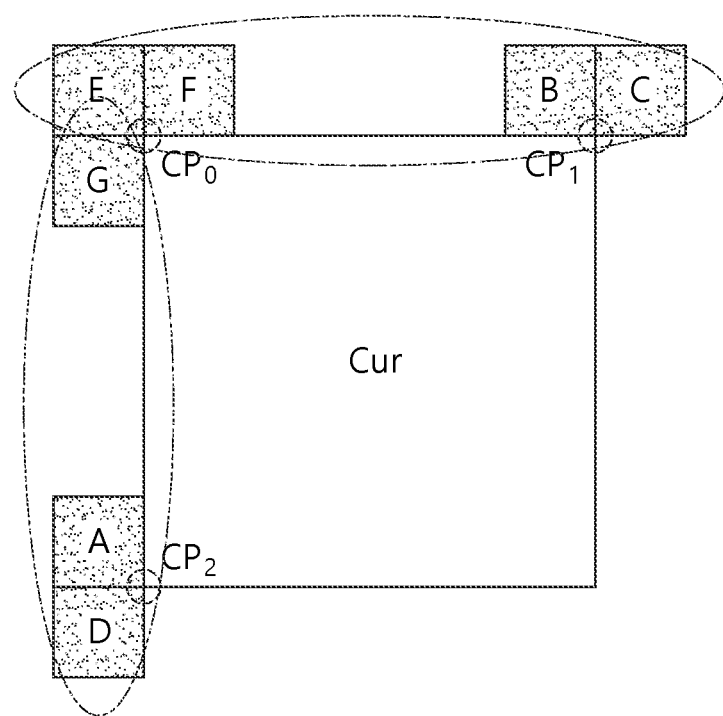

FIG. 9 shows the arrangement of neighboring blocks scanned when detecting a neighboring block coded based on the affine motion prediction, which is the same as the arrangement shown in FIG. 8. However, in the embodiment according to FIG. 9, the affine MVP candidates may be determined based on maximum p of 4×4 neighboring blocks contained inside a closed broken line located left of the current block and maximum q of 4×4 neighboring blocks contained inside a closed broken line located top of the current block. For example, if p and q are each 1, the affine MVP candidates may be determined based on the affine coding block coming first in the scanning order among the 4×4 neighboring blocks contained inside the closed broken line located left of the current block and the affine coding block coming first in the scanning order among the 4×4 neighboring blocks contained inside the closed broken line located top of the current block.

Figure 10:
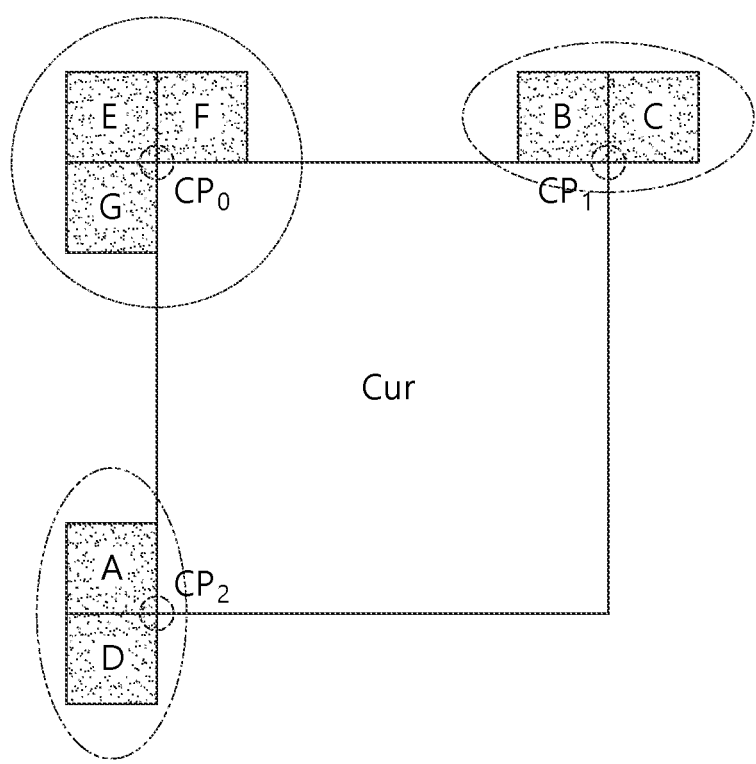

Referring to FIG. 10, the affine MVP candidates may be determined based on the affine coding block coming first in the scanning order among the block E, which is a top-left corner neighboring block, the block G, which is a first left neighboring block, and the block F, which is a first top neighboring block, that are located at the neighbor of the CP0, on the affine coding block coming first in the scanning order among the block C, which is a top-right neighboring block, and the block B, which is a second top neighboring block, that are located at the neighbor of the CP1, and on the affine coding block coming first in the scanning order among the block D, which is a bottom-left corner neighboring block, and the block A, which is a second left neighboring block, that are located at the neighbor of the CP2.

Meanwhile, the scanning order of the above-described scanning method may be determined based on probability and performance analysis of a specific encoding apparatus or a decoding apparatus. Accordingly, according to an embodiment, rather than being specified, the scanning order may be determined based on statistical characteristics or performance of the encoding apparatus or decoding apparatus to which the present embodiment is applied.

Figure 11:
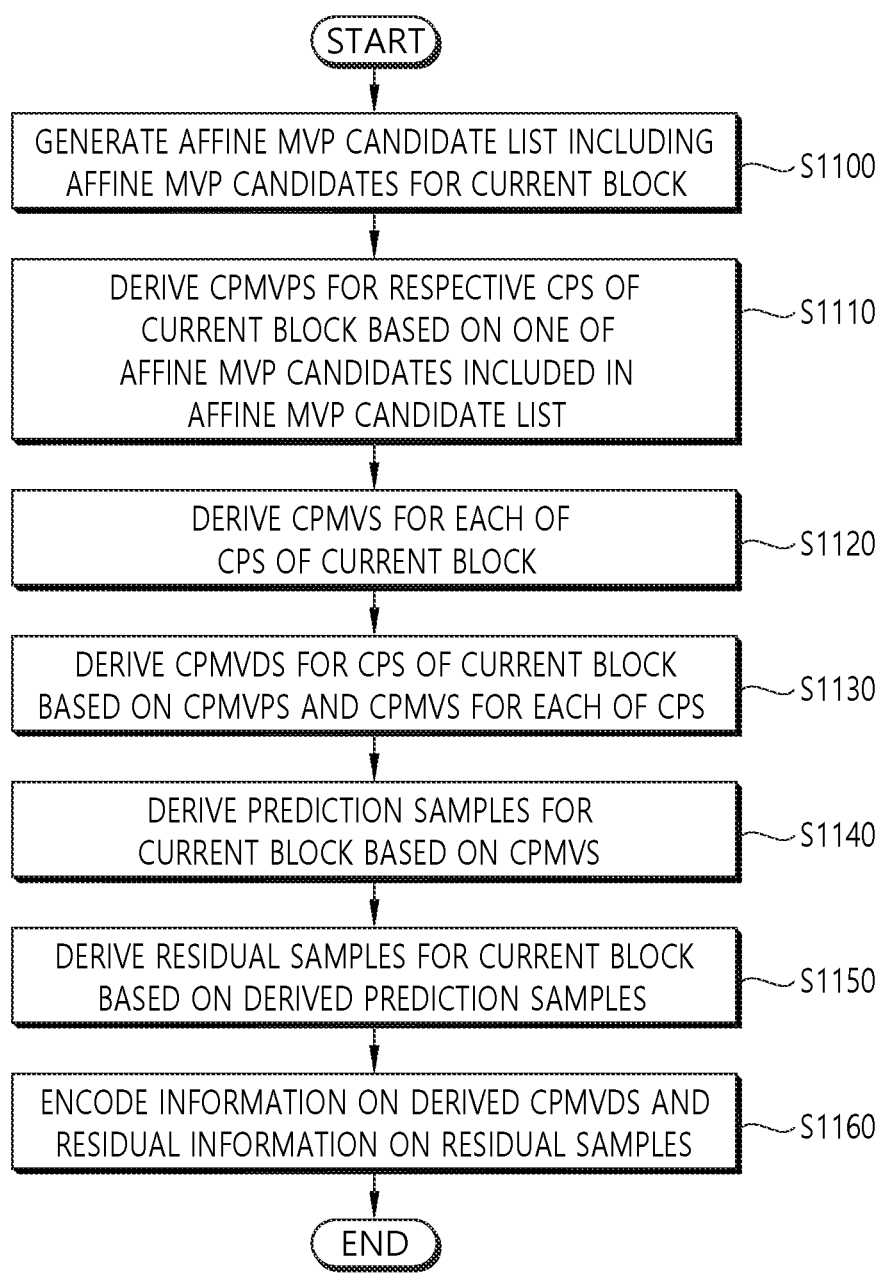
FIG. 11 is a flowchart showing an operation method of an encoding apparatus according to an embodiment.
Figure 12:
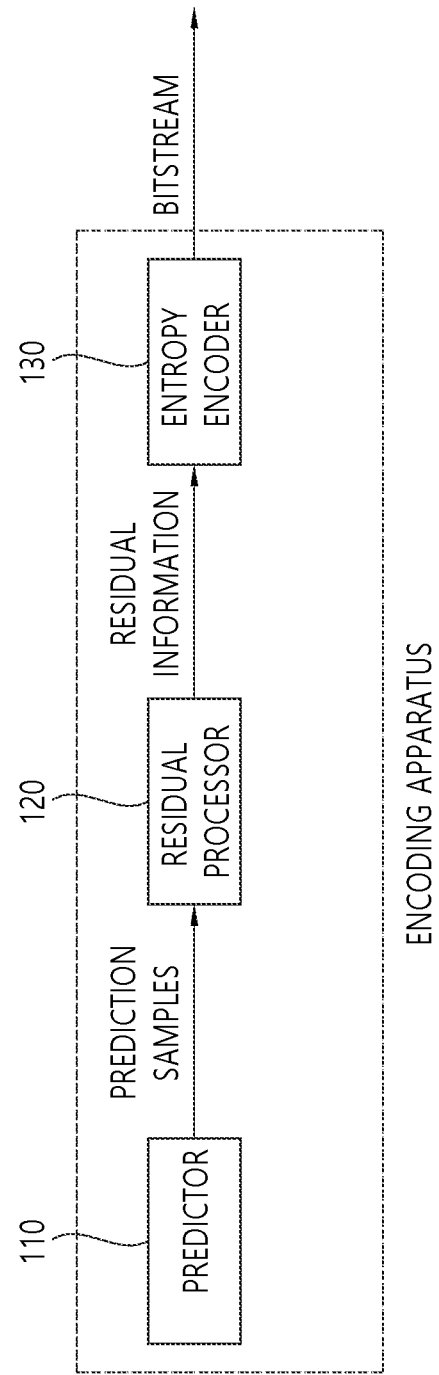
FIG. 12 is a block diagram showing a configuration of an encoding apparatus according to an embodiment.

FIG. 11 is a flowchart showing an operation method of an encoding apparatus according to an embodiment, and FIG. 12 is a block diagram showing a configuration of an encoding apparatus according to an embodiment.

The encoding apparatus according to FIGS. 11 and 12 may perform operations corresponding to those of a decoding apparatus according to FIGS. 13 and 14 to be described later. Accordingly, the contents described later in FIGS. 13 and 14 may be similarly applied to the encoding apparatus of FIGS. 11 and 12.

Each step disclosed in FIG. 11 may be performed by the encoding apparatus 100 disclosed in FIG. 1. More specifically, S1100 to S1140 may be performed by the predictor 110 disclosed in FIG. 1, S1150 may be performed by the residual processor 120 disclosed in FIG. 1, and S1160 may be performed by the entropy encoder 130 disclosed in FIG. 1. Furthermore, operations according to S1100 to S1160 are based on some of contents described above in FIGS. 3 to 10. Therefore, an explanation for the specific content duplicated with contents described above in FIG. 1, and 3 to 10 will be omitted or made briefly.

As shown in FIG. 12, the encoding apparatus according to an embodiment may include the predictor 110 and the entropy encoder 130. However, in some cases, all of the components shown in FIG. 12 may not be essential components of the encoding apparatus, and the encoding apparatus may be implemented by more or less components than those shown in FIG. 12.

In the encoding apparatus according to an embodiment, the predictor 110 and the entropy encoder 130 may be implemented by separate chips, or at least two or more components may be implemented by a single chip.

The encoding apparatus according to an embodiment may generate the affine MVP candidate list including the affine MVP candidates for the current block (S1100). More specifically, the predictor 110 of the encoding apparatus may generate the affine MVP candidate list including the affine MVP candidates for the current block.

The encoding apparatus according to an embodiment may derive CPMVPs for respective CPs of the current block based on one of the affine MVP candidates included in the affine MVP candidate list (S1110). More specifically, the predictor 110 of the encoding apparatus may derive CPMVPs for respective CPs of the current block based on one of the affine MVP candidates included in the affine MVP candidate list.

The encoding apparatus according to an embodiment may derive CPMVs for the respective CPs of the current block (S1120). More specifically, the predictor 110 of the encoding apparatus may derive CPMVs for the respective CPs of the current block.

The encoding apparatus according to an embodiment may derive CPMVDs for the CPs of the current block based on the CPMVPs and the CPMVs for the respective CPs (S1130). More specifically, the predictor 110 of the encoding apparatus may derive CPMVDs for the CPs of the current block based on the CPMVPs and the CPMVs for the respective CPs.

The encoding apparatus according to an embodiment may derive the prediction samples for the current block based on the CPMVs (S1140). More specifically, the predictor 110 of the encoding apparatus may derive the prediction samples for the current block based on the CPMVs.

The encoding apparatus according to an embodiment may derive the residual samples for the current block based on the derived prediction samples (S1150). More specifically, the residual processor 120 of the encoding apparatus may derive residual samples for the current block based on the derived prediction samples.

The encoding apparatus according to an embodiment may encode information on the derived CPMVDs and residual information on the residual samples (S1160). More specifically, the entropy encoder 130 of the encoding apparatus may encode information on the derived CPMVDs and residual information on the residual samples.

According to the encoding apparatus and the operation method of the encoding apparatus disclosed in FIGS. 11 and 12, the encoding apparatus may generate an affine MVP candidate list including affine MVP candidates for a current block (S1100), derive CPMVPs for respective CPs of the current block based on one of the affine MVP candidates included in the affine MVP candidate list (S1110), derive CPMVs for the respective CPs of the current block (S1120), derive CPMVDs for the CPs of the current block based on the CPMVPs and the CPMVs for the respective CPs (S1130), derive prediction samples for the current block based on the CPMVs (S1140), derive residual samples for the current block based on the derived prediction samples (S1150), and encode information on the derived CPMVDs and residual information on the residual samples (S1160). That is, it is possible to increase image coding efficiency by signaling information on the affine MVP candidate list used for affine motion prediction.

Figure 13:
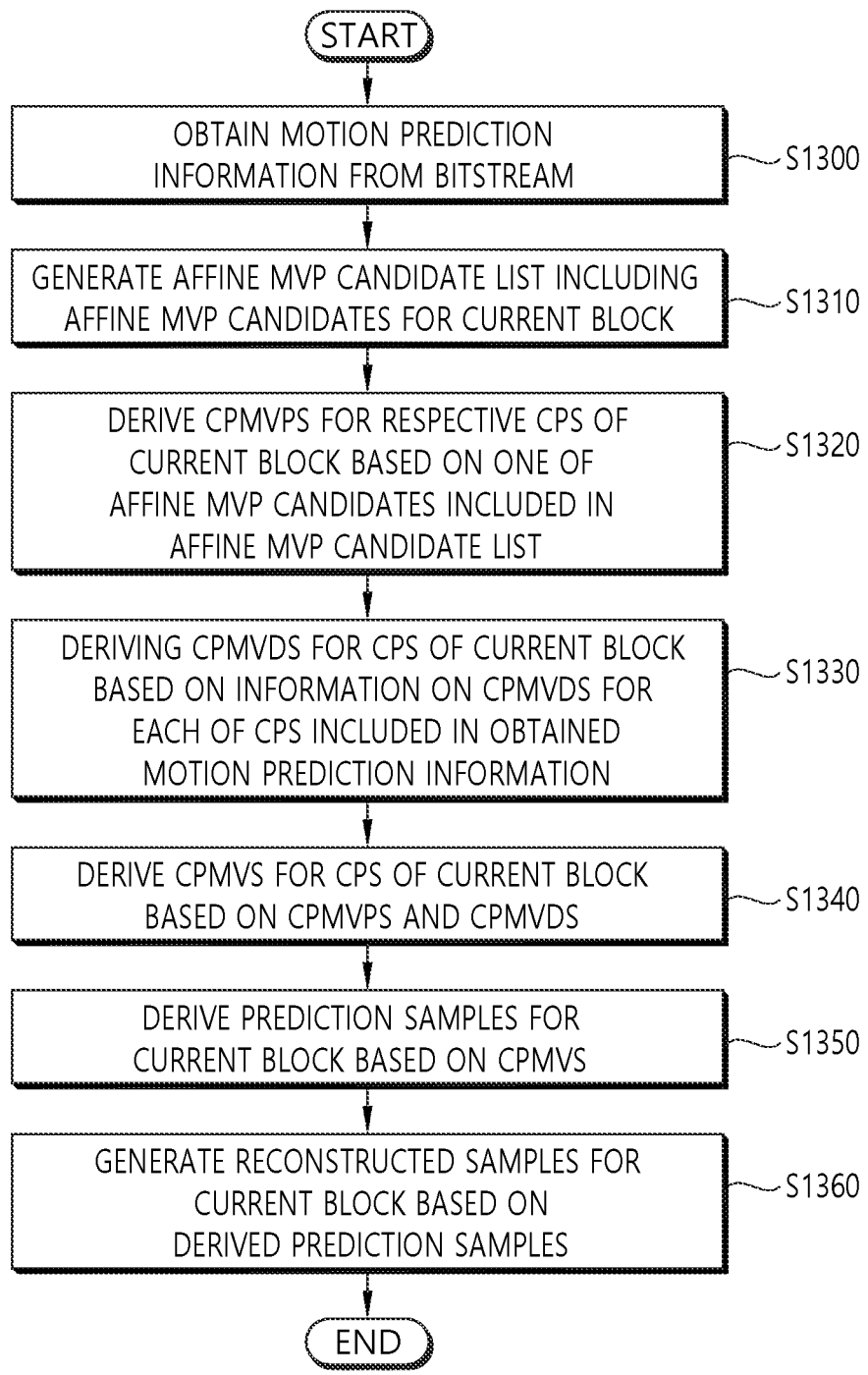
FIG. 13 is a flowchart showing an operation method of a decoding apparatus according to an embodiment.
Figure 14:
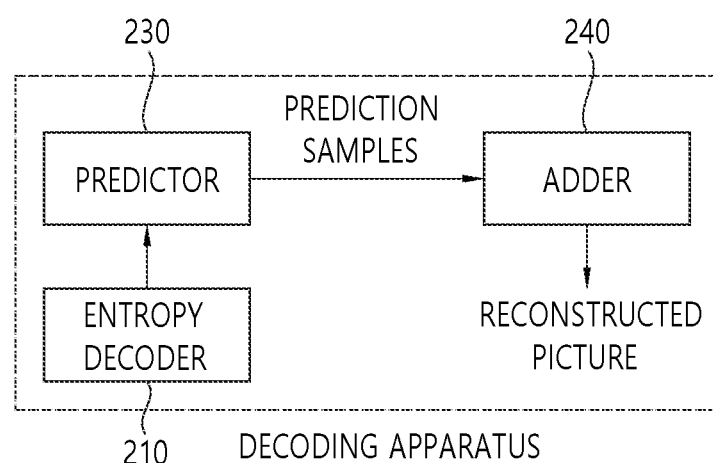
FIG. 14 is a block diagram showing a configuration of a decoding apparatus according to an embodiment.

FIG. 13 is a flowchart showing an operation method of a decoding apparatus according to an embodiment, and FIG. 14 is a block diagram showing a configuration of a decoding apparatus according to an embodiment.

Each step disclosed in FIG. 13 may be performed by the decoding apparatus 200 disclosed in FIG. 2. More specifically, S1300 may be performed by the entropy decoder 210 disclosed in FIG. 2, S1310 to S1350 may be performed by the predictor 230 disclosed in FIG. 2, and S1360 may be performed by the adder 240 disclosed in FIG. 2. Furthermore, operations according to S1300 to S1360 are based on some of contents described above in FIGS. 3 to 10. Therefore, an explanation for the specific content duplicated with contents described above in FIGS. 2 to 10 will be omitted or made briefly.

As shown in FIG. 14, the decoding apparatus according to an embodiment may include the entropy decoder 210, the predictor 230, and the adder 240. However, in some cases, all of the components shown in FIG. 14 may not be essential components of the decoding apparatus, and the decoding apparatus may be implemented by more or less components than those shown in FIG. 14.

In the decoding apparatus according to an embodiment, the entropy decoder 210, the predictor 230, and the adder 240 may be implemented by separate chips, or at least two or more components may be implemented by a single chip.

The decoding apparatus according to an embodiment may obtain motion prediction information from a bitstream (S1300). More specifically, the entropy decoder 210 of the decoding apparatus may obtain motion prediction information from a bitstream.

The decoding apparatus according to an embodiment may generate an affine MVP candidate list including affine motion vector predictor (MVP) candidates for a current block (S1310). More specifically, the predictor 230 of the decoding apparatus may generate an affine MVP candidate list including the affine MVP candidates for the current block.

In an embodiment, the affine MVP candidates may include a first affine MVP candidate and a second affine MVP candidate, the first affine MVP candidate may be derived from on a left block group including a bottom-left corner neighboring block and left neighboring block of the current block, and the second affine MVP candidate may be derived from a top block group including a top-right corner neighboring block, top neighboring block and top-left corner neighboring block of the current block. In this regard, the first affine MVP candidate may be derived based on a first block included in the left block group, the first block may be coded based on affine motion prediction, the second affine MVP candidate may be derived based on a second block included in the top block group, and the second block may be coded based on affine motion prediction.

In another embodiment, the affine MVP candidates may include a first affine MVP candidate and a second affine MVP candidate, the first affine MVP candidate may be derived from a left block group including a bottom-left corner neighboring block, first left neighboring block and second left neighboring block of the current block, and, the second affine MVP candidate may be derived from a top block group including a top-right corner neighboring block, first top neighboring block, second top neighboring block and top-left corner neighboring block of the current block. In this regard, the first affine MVP candidate may be derived based on a first block included in the left block group, the first block may be coded based on affine motion prediction, the second affine MVP candidate may be derived based on a second block included in the top block group, and the second block may be coded based on affine motion prediction.

In still another embodiment, the affine MVP candidates may include a first affine MVP candidate, a second affine MVP candidate, and a third affine MVP candidate, the first affine MVP candidate may be derived from a bottom-left block group including a bottom-left corner neighboring block and first left neighboring block of the current block, the second affine MVP candidate may be derived from a top-right block group including a top-right corner neighboring block and first top neighboring block of the current block, and, the third affine MVP candidate may be derived from a top-left block group including a top-left corner neighboring block, second top neighboring block and second left neighboring block of the current block. In this regard, the first affine MVP candidate may be derived based on a first block included in the bottom-left block group, the first block may be coded based on affine motion prediction, the second affine MVP candidate may be derived based on a second block included in the top-right block group, the second block may be coded based on affine motion prediction, the third affine MVP candidate may be derived based on a third block included in the top-left block group, and the third block may be coded based on affine motion prediction.

The decoding apparatus according to an embodiment may derive CPMVPs for respective CPs of the current block based on one of the affine MVP candidates included in the affine MVP candidate list (S1320). More specifically, the predictor 230 of the decoding apparatus may derive CPMVPs for respective CPs of the current block based on one affine MVP candidate of the affine MVP candidates included in the affine MVP candidate list.

In an embodiment, the one affine MVP candidate may be selected from among the affine MVP candidates based on an affine MVP candidate index included in the motion prediction information.

The decoding apparatus according to an embodiment may derive the CPMVDs for the CPs of the current block based on information on CPMVDs for each of the CPs included in the obtained motion prediction information (S1330). More specifically, the predictor 230 of the decoding apparatus may derive the CPMVDs for the CPs of the current block based on information on CPMVDs for each of the CPs included in the obtained motion prediction information.

The decoding apparatus according to an embodiment may derive CPMVs for the CPs of the current block based on the CPMVPs and the CPMVDs (S1340). More specifically, the predictor 230 of the decoding apparatus may derive CPMVs for the CPs of the current block based on the CPMVPs and the CPMVDs.

The decoding apparatus according to an embodiment may derive prediction samples for the current block based on the CPMVs (S1350). More specifically, the prediction unit 230 of the decoding apparatus may derive prediction samples for the current block based on the CPMVs.

The decoding apparatus according to an embodiment may generate reconstructed samples for the current block based on the derived prediction samples (S1360). More specifically, the adder 240 of the decoding apparatus may generate reconstructed samples for the current block based on the derived prediction samples.

In an embodiment, the motion prediction information may include information on a context index indicating whether or not a neighboring block for the current block coded based on affine motion prediction exists.

In an embodiment, with respect to a case where the value of m described above in the description of the first step is 1, and the value of n described above in the description of Tables 1 and 2 is 2, a CABAC context model for encoding and decoding index information for indicating an optimal affine MVP candidate may be constructed. When an affine coding block exists at the neighbor of the current block, the affine MVP candidate of the current block may be determined based on the affine motion model as described above with reference to FIGS. 7 to 10, but when the affine coding block does not exist at the neighbor of the current block, the present embodiment may be applied. Since the affine MVP candidate has high reliability when the affine MVP candidate is determined based on the affine coding block, the context model may be designed such that it may distinguish between a case where the affine MVP candidate is determined based on the affine coding block and a case where the affine MVP candidate is determined in a different way. In this case, index 0 may be allocated to the affine MVP candidate determined based on the affine coding block. The CABAC context index according to the present embodiment is shown in Equation 5 below.

$$\text{ctx\_idx\_for\_aamvp\_idx} = \begin{cases} 0, & \text{if at least one neighbor block is coded as affine prediction} \\ 1, & \text{otherwise} \end{cases}$$ [Equation 5]

The initial value according to the CABAC context index may be determined as shown in Table 3 below, and the CABAC context index and the initial value need to satisfy the condition of Equation 6 below.

TABLE 3

| ctx_idx_for_aamvp_idx | 0 | 1 |
|---|---|---|
| Init_val | $N_0$ | $N_1$ |

$p(\text{aamvp\_idx}=0|\text{init\_val}=N_0) > p(1|N_0)$ $p(\text{aamvp\_idx}=0|\text{init\_val}=N_0) > p(0|N_1)$ $p(\text{aamvp\_idx}=0|\text{init\_val}=N_0) > p(1|N_1)$ [Equation 6]

According to the decoding apparatus and the operation method of the decoding apparatus of FIGS. 13 and 14, the decoding apparatus may obtain motion prediction information from a bitstream (S1300), generate an affine MVP candidate list including affine MVP candidates for a current block (S1310), derive CPMVPs for respective CPs of the current block based on one of the affine MVP candidates included in the affine MVP candidate list (S1320), derive CPMVDs for the CPs of the current block based on information on the CPMVDs for the respective CPs included in the obtained motion prediction information (S1330), derive control point motion vectors (CPMVs) for the CPs of the current block based on the CPMVPs and the CPMVDs (S1340), derive prediction samples for the current block based on the CPMVs (S1350), and generate reconstructed samples for the current block based on the derived prediction samples (S1360). That is, it is possible to increase image coding efficiency by signaling information on the affine MVP candidate list used for affine motion prediction.

Meanwhile, the methods according to the above-described embodiments of the present specification are directed to image and video compression, may be applied to both an encoding apparatus and a decoding apparatus, may be applied to both an apparatus generating a bitstream and an apparatus receiving a bitstream, and may be applied regardless of whether or not a terminal outputs through a display device. For example, an image may be generated as compressed data by a terminal having an encoding apparatus, the compressed data may have a bitstream form, and the bitstream may be stored in various types of storage devices, and be streamed through a network and delivered to a terminal having a decoding apparatus. When the terminal is equipped with a display device, the decoded image may be displayed on the display device, or the bitstream data may be simply stored in the terminal.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

Each of the above-described parts, modules or units may be a processor or a hardware part that executes successive processes stored in a memory (or storage unit). Each of the steps described in the embodiments above may be performed by a processor or hardware parts. Each module/block/unit in the above-described embodiments may operate as a hardware/processor. In addition, the methods presented by the present disclosure may be implemented in code. This code can be written to a storage medium that can be read by a processor, and thus can be read by a processor provided by the apparatus.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

When embodiments in the present disclosure are embodied by a software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device.

What is claimed is:

1. A picture decoding method performed by a decoding apparatus, the method comprising:
   obtaining motion prediction information and residual information from a bitstream;
   generating an affine motion vector predictor (MVP) candidate list including affine MVP candidates for a current block;
   selecting one of the affine MVP candidates in the affine MVP candidate list based on an affine MVP candidate index in the motion prediction information;
   deriving control point motion vector predictors (CPMVPs) for control points (CPs) of the current block based on the selected affine MVP candidate;
   deriving control point motion vector differences (CPMVDs) for the CPs of the current block based on information on the CPMVDs for the CPs included in the motion prediction information;
   deriving control point motion vectors (CPMVs) for the CPs of the current block based on the CPMVPs and the CPMVDs;
   deriving prediction samples for the current block based on the CPMVs for the CPs of the current block;
   deriving residual samples for the current block based on the residual information; and
   generating reconstructed samples for the current block based on the prediction samples and the residual samples,
   wherein the affine MVP candidates in the affine MVP candidate list comprise a first affine MVP candidate and a second affine MVP candidate,
   wherein the CPs include a CP0, a CP1 and a CP2, and the CPMVPs for the CPs include a first MVP for the CP0, a second MVP for the CP1 and a third MVP for the CP2,
   wherein the CP0 is located in a top-left corner of the current block, the CP1 is located in a top-right corner of the current block and the CP2 is located in a bottom-left corner of the current block,
   wherein the first MVP, the second MVP and the third MVP constituting the first affine MVP candidate are derived based on a first block being coded based on an affine motion model in a left block group,
   wherein the left block group includes a bottom-left corner neighboring block of the current block and a left neighboring block adjacent to a top of the bottom-left corner neighboring block,
   wherein the first MVP, the second MVP and the third MVP constituting the second affine MVP candidate are derived based on a second block being coded based on the affine motion model in a top block group,
   wherein the top block group includes a top-right corner neighboring block, a top neighboring block adjacent to a left of the top-right corner neighboring block and a top-left corner neighboring block of the current block,
   wherein the left block group excludes the top-right corner neighboring block, the top neighboring block and the top-left corner neighboring block, and
   wherein the top block group excludes the bottom-left corner neighboring block and the left neighboring block.

2. A picture encoding method performed by an encoding apparatus, the method comprising:
   generating an affine motion vector predictor (MVP) candidate list including affine MVP candidates for a current block;
   selecting one of the affine MVP candidates in the affine MVP candidate list;
   deriving an affine MVP candidate index related to the selected affine MVP candidate;
   deriving control point motion vector predictors (CPMVPs) for CPs of the current block based on the selected affine MVP candidate;
   deriving control point motion vectors (CPMVs) for the CPs of the current block;
   deriving control point motion vector differences (CPMVDs) for the CPs of the current block based on the CPMVPs and the CPMVs;
   deriving prediction samples for the current block based on the CPMVs for the CPs of the current block;
   deriving residual samples for the current block based on the prediction samples; and
   encoding information related to the affine MVP candidate index, information on the CPMVDs and residual information on the residual samples, wherein the affine MVP candidates in the affine MVP candidate list comprise a first affine MVP candidate and a second affine MVP candidate, wherein the CPs include a CP0, a CP1 and a CP2, and the CPMVPs for the CPs include a first MVP for the CP0, a second MVP for the CP1 and a third MVP for the CP2, wherein the CP0 is located in a top-left corner of the current block, the CP1 is located in a top-right corner of the current block and the CP2 is located in a bottom-left corner of the current block, wherein the first MVP, the second MVP and the third MVP constituting the first affine MVP candidate are derived based on a first block being coded based on an affine motion model in a left block group, wherein the left block group includes a bottom-left corner neighboring block of the current block and a left neighboring block adjacent to a top of the bottom-left corner neighboring block, wherein the first MVP, the second MVP and the third MVP constituting the second affine MVP candidate are derived based on a second block being coded based on the affine motion model in a top block group, wherein the top block group includes a top-right corner neighboring block, a top neighboring block adjacent to a left of the top-right corner neighboring block and a top-left corner neighboring block of the current block, wherein the left block group excludes the top-right corner neighboring block, the top neighboring block and the top-left corner neighboring block, and wherein the top block group excludes the bottom-left corner neighboring block and the left neighboring block.

3. A non-transitory computer-readable storage medium storing a bitstream generated by the picture encoding method of claim 2.

4. A transmission method of data for a picture, the method comprising:

obtaining a bitstream for the picture, wherein the bitstream is generated based on generating an affine motion vector predictor (MVP) candidate list including affine MVP candidates for a current block, selecting one of the affine MVP candidates in the affine MVP candidate list, deriving an affine MVP candidate index related to the selected affine MVP candidate, deriving control point motion vector predictors (CPMVPs) for CPs of the current block based on the selected affine MVP candidate, deriving control point motion vectors (CPMVs) for the CPs of the current block, deriving control point motion vector differences (CPMVDs) for the CPs of the current block based on the CPMVPs and the CPMVs, deriving prediction samples for the current block based on the CPMVs for the CPs of the current block, deriving residual samples for the current block based on the prediction samples, and encoding information related to the affine MVP candidate index, information on the CPMVDs and residual information on the residual samples; and transmitting the data comprising the bitstream, wherein the affine MVP candidates in the affine MVP candidate list comprise a first affine MVP candidate and a second affine MVP candidate, wherein the CPs include a CP0, a CP1 and a CP2, and the CPMVPs for the CPs include a first MVP for the CP0, a second MVP for the CP1 and a third MVP for the CP2, wherein the CP0 is located in a top-left corner of the current block, the CP1 is located in a top-right corner of the current block and the CP2 is located in a bottom-left corner of the current block, wherein the first MVP, the second MVP and the third MVP constituting the first affine MVP candidate are derived based on a first block being coded based on an affine motion model in a left block group, wherein the left block group includes a bottom-left corner neighboring block of the current block and a left neighboring block adjacent to a top of the bottom-left corner neighboring block, wherein the first MVP, the second MVP and the third MVP constituting the second affine MVP candidate are derived based on a second block being coded based on the affine motion model in a top block group, wherein the top block group includes a top-right corner neighboring block, a top neighboring block adjacent to a left of the top-right corner neighboring block and a top-left corner neighboring block of the current block, wherein the left block group excludes the top-right corner neighboring block, the top neighboring block and the top-left corner neighboring block, wherein the left block group excludes the top-right corner neighboring block, the top neighboring block and the top-left corner neighboring block, and wherein the top block group excludes the bottom-left corner neighboring block and the left neighboring block.

* * * * *